July 1, 1924.

A. BANDELIER 1,499,760

DUST LAYING DEVICE FOR MOTOR VEHICLES

Filed Feb. 10, 1923 3 Sheets-Sheet 1

INVENTOR:
Alphonse Bandelier
BY Wm Wallace White
ATTY.

July 1, 1924.

A. BANDELIER

DUST LAYING DEVICE FOR MOTOR VEHICLES

Filed Feb. 10, 1923

INVENTOR:
Alphonse Bandelier
BY Wm Wallace White
ATT'Y.

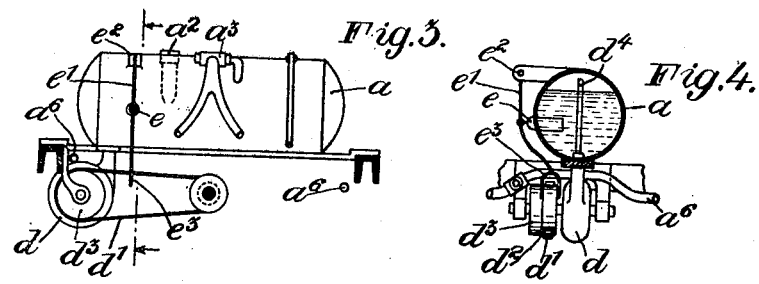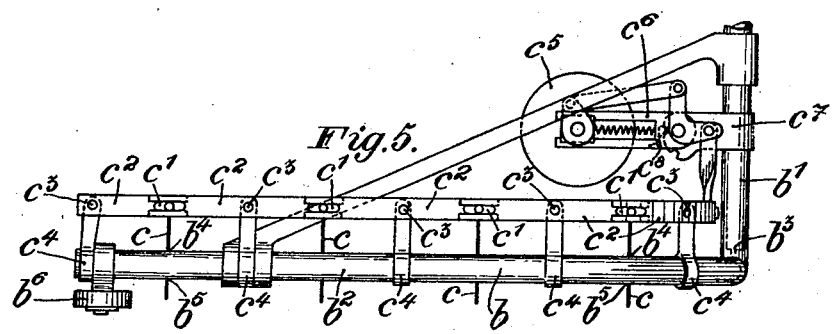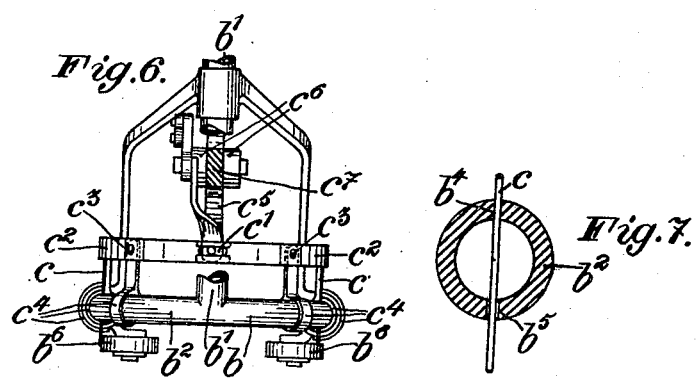

Patented July 1, 1924.

1,499,760

UNITED STATES PATENT OFFICE.

ALPHONSE BANDELIER, OF LAUSANNE, SWITZERLAND.

DUST-LAYING DEVICE FOR MOTOR VEHICLES.

Application filed February 10, 1923. Serial No. 618,187.

*To all whom it may concern:*

Be it known that I, ALPHONSE BANDELIER, a citizen of Switzerland, residing at Lausanne, Canton of Vaud, in the Confederation of Switzerland have invented certain new and useful Dust-Laying Devices for Motor Vehicles, of which the following is a specification.

The object of the invention is to provide a device for preventing motor road vehicles from raising dust, by throwing atomized water on to the ground immediately about each wheel of the vehicle, which device comprises a water reservoir connected to tubular sprinklers and means subjected to a reciprocatory movement and operated by the running of the vehicle for maintaining the nozzles of the sprinklers constantly free from chocking.

The device for carrying the method into practice comprises in combination a water tank connected to the sprinkling tubes bent in U shape and surrounding the rear part of each wheel of the vehicle, hole cleaners which are subjected to an alternative movement and serving to maintain the orifices of the sprinkling tubes constantly open, a pump driven by the motor of the vehicle and serving for compressing the air contained within the water tank, a safety valve which automatically uncouples the pump from the motor as soon as the pressure within the tank has attained a predetermined maximum value.

The attached drawing shows by way of example a working form of a device according to the invention.

Fig. 3 is a side elevation of the tank and pump drive forming a part of the improved apparatus;

Fig. 4 is an end view of the structure shown in Fig. 3;

Fig. 5 is a side elevation of the sprinkling device;

Fig. 6 is an end view, partly in section, of the structure shown in Fig. 5; and

Fig. 7 is a transverse sectional view of the sprinkling tube.

Figure 1:
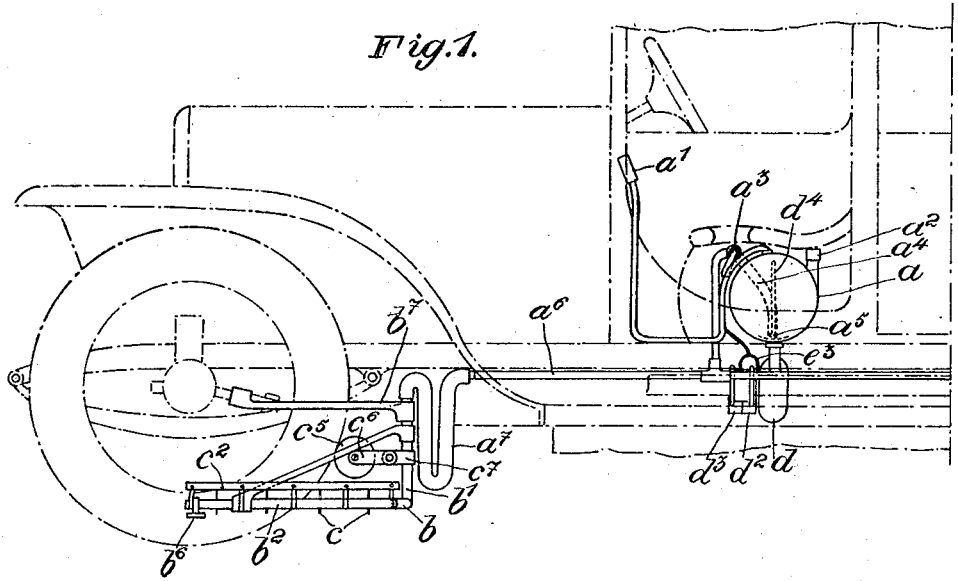
Figs. 1 and 2 are respectively a side elevation and a plan view illustrating the present invention attached to an automobile, the latter being shown in dotted lines. For convenience of illustration, both of these figures are shown in two parts.
Figure 1:
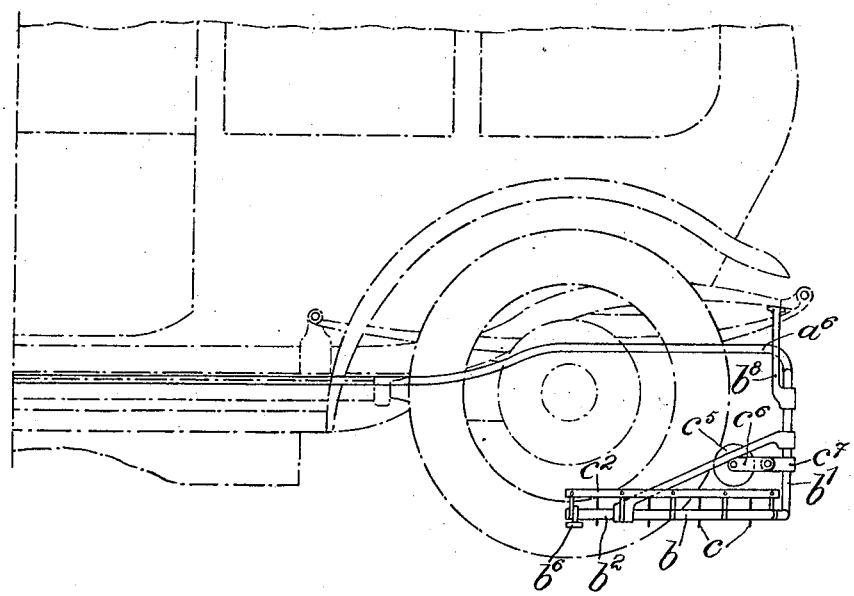
Figure 2:
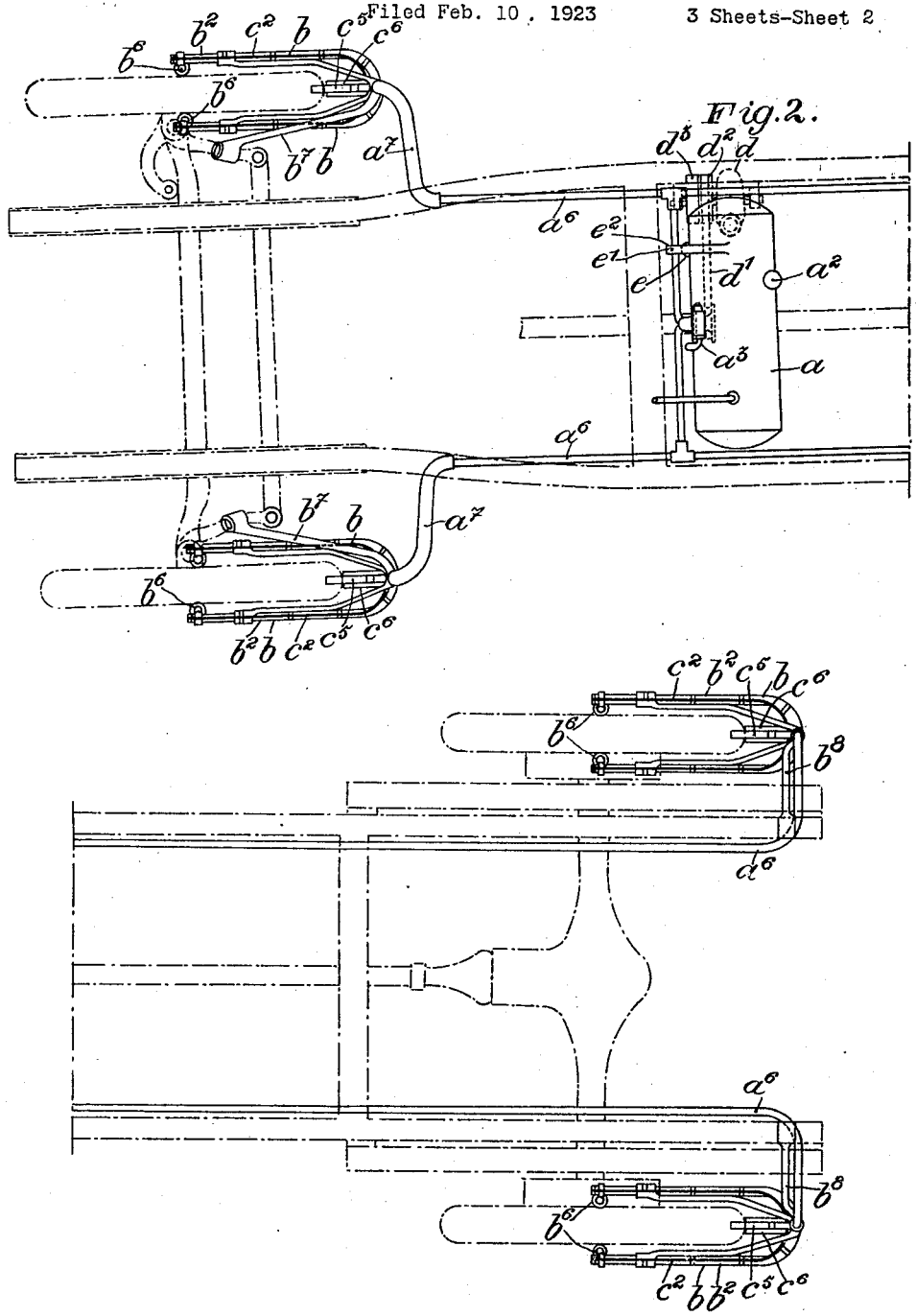

In the drawings the essential parts of the vehicle are indicated in dotted lines only in order to facilitate the understanding of the device proper.

$a$ is the water tank, $b$ the sprinkling tubes bent in U shape and surrounding the rear part of each one of the wheels, $c$ are the hole cleaners which are subjected to a to-and-fro movement in order to maintain the orifices of the sprinkling tubes constantly open. $d$ is the pump and $e$ the safety valve.

The tank $a$ has the shape of an elongated cylinder arranged underneath the seat of the driver. Its walls are of sufficient thickness to resist the maximum interior pressure of the tank which pressure may be controlled by a manometer $a^1$ disposed on the board in front of the driver's seat. The tank has a holding capacity of about 60 to 80 litres and is normally filled by means of a trunk pipe $a^2$ to three quarters of its capacity before each run of the vehicle. $a^3$ is a valve arranged within easy reach of the driver and allowing the simultaneous admission of the air and water mixture into the four sprinkling pipes $b$. The intake tube for the mixture reaches nearly to the bottom of the tank and its free end offers a slanting edge in order to facilitate the entrance of the mixture and to prevent the blocking of the intake opening by a foreign body which might occasionally get between the bottom of the tank and the intake orifice of said tube.

A little above the steering cock the conduit connecting the tank $a$ with the sprinkling tubes $b$ is bifurcated and is connected to two parallel pipes $a^6$ arranged along the beams of the vehicle structure.

The four extremities of the two pipes $a^6$ are connected by means of flexible tubes $a^7$ to the four sprinklers $b$. These latter comprise each one a vertical portion $b^1$ and a horizontally arranged tube $b^2$ bent so as to form a U and carried on the lower end of the vertical portions $b^1$. These latter communicate with the two lateral arms of the tube $b^2$ through two apertures of a diameter of about 3 mm. Oblique supports $b^3$ connect the tubes $b^2$ firmly with the vertical portions $b^1$. The tube $b^2$ is perforated on the top and on the base in eight places which are separated one from the other by distances of equal length. The orifices $b^4$ (see Fig. 7) on the top side of the arms $b^2$ have a diameter of 1 mm. and a needle $c$ sliding in them is given a play of 1/100 mm. The orifices at the base of the arm $b^2$ are also 1 mm. in diameter, but the needle $c$ sliding within them is allowed a play of about 1/3 mm. At both of its ends the tube $b$ carries a wheel $b^6$ which bears on both sides of the tyre of the vehicle wheel so as to hold the two arms $b^2$ of the U shaped tube $b$ always in constant distance away from said wheel.

The two sprinkler tubes $b$ of the front wheels are carried by supports $b^7$ fixed in a suitable way to the coupling rod of the direction wheels, whilst the two sprinklers of the hind wheels are carried by bent arms $b^8$ fixed to the frame of the vehicle.

An orifice cleaner $c$ constituted by the needle above referred to is traversing each corresponding pair of apertures $b^4$, $b^5$. The needle $c$ is carried at its top T-shaped end, working in a sliding groove $c^1$ at the articulation of two levers $c^2$. Each one of these levers is pivoted on $c^3$ upon a pin carried by a collar $c^4$ fixed to the tube $b^2$ and lies vertically above said tube. These levers constitute on both sides of the vertical portion $b^1$ two articulated systems of five levers each. An oscillatory movement is simultaneously imparted to these two systems by means of a small wheel $c^5$ driven by the vehicle wheel making use of any suitable intermediary means adapted to transform to rotary motion into an alternative or to and fro movement.

The wheel $c^5$ is mounted upon an axle carried by an oscillating fork $c^6$ hinged to a bracket $c^7$ fixed to the vertical tube portion $b^1$ in such a manner that the driver by hand can by means of a spring $c^8$ easily bring it in and out of contact with the tyres.

It is therefore evident that when the vehicle is traveling a vertical alternating movement may be imparted to the needles $c$ by bringing the wheel $c^5$ into engagement with the vehicle wheel. The diameter of the upper holes $b^4$ is just sufficient to permit the needles $c$ to have a free sliding movement, but not enough to allow a jet of mixed air and water to be forced upwardly therethrough. On the other hand the greater diameter given to the lower holes $b^5$ at the base of the tube $b^2$ permits the water to escape around the needles in the shape of a fine jet. The movement of the needles prevent the base holes from becoming choked with mud or dust.

The body of the pump $d$ is arranged underneath the tank $a$ and its horizontal shaft is driven by means of a belt $d^1$ from the vehicle shaft whenever the belt is on the fixed pulley $d^2$. On the one side of this fixed pulley $d^2$ is arranged an idle running or loose pulley $d^3$ onto which the belt is shifted automatically as soon as the pressure in the tank attains a predetermined maximum value under the action of the safety valve $e$ which operates by the intermediary of a lever $e^1$ pivoted in $e^2$ and of a fork $e^3$. The return pipe $d^4$ of the pump is connected to the upper portion of the tank $a$.

The working manner of this device is as follows:

After the motor of the vehicle has been started the driver turns the valve $a^3$ toward its closed position until the pressure in the interior of the tank $a$ attains a given working pressure indicated by the manometer $a^1$. This pressure, assisted by the vibrations of the machine, causes an intimate mixture of the air and the water contained in the interior of the tank. If the working pressure is attained within the tank then the driver may if he wishes to prevent the road dust from being raised by the vehicle, open the cock $a^3$, or if he does not open it, the saftey valve will automatically disconnect the pump $d$ from the driving shaft.

Let us now presume that the uncoupling of the pump has actually taken place. If now the driver later on opens the cock $a^3$ the pressure in the interior of the tank $a$ will immediately go down which makes the safety valve $e$ to close and consequently to again connect the pump $e$ to the driving shaft of the vehicle. On the other hand the pipes $a^6$, $a^7$ and the vertical tube portion $b^1$ will get filled with water and the orifice $b^3$ within the latter will let pass just enough of it to feed the eight apertures $b^5$ of each sprinkler tube $b$. If in this moment the wheels $c^5$ are bearing against the vehicle wheels, the needles $c$ are subjected to an alternative movement and the apertures $b^5$ are effectively prevented from becoming stopped up.

In order to stop the working of the sprinkler the driver needs only to close the steering cock $a^3$.

When the vehicle has to travel considerable distances the driver, in order to economize his supply of water, will use the apparatus only when passing through towns or villages, or upon the most frequently travelled roads leading thereto.

Having now fully described my invention and the manner in which it is to be carried out, I declare that what I claim is:

1. Dust laying apparatus for motor vehicles, comprising a water reservoir carried by the vehicle, tubular sprinklers connected to said reservoir and having outlet nozzles adapted to sprinkler water on the ground immediately about each wheel of the vehicle, and reciprocatory means operated by the wheels of the vehicle for maintaining the nozzles of said sprinklers free from choking.

2. Dust laying apparatus for motor vehicles, comprising, in combination, a water reservoir carried by the vehicle, tubular sprinklers connected to said reservoir and having outlet nozzles, said sprinklers being disposed in the form of a U embracing the rear part of each wheel of the vehicle, a pump driven by the engine of the vehicle for compressing the air within the reservoir, a safety valve adapted to automatically disengage the pump from the motor when the pressure within the reservoir reaches a predetermined limit, and reciprocatory means operated by the wheels of the vehicle for maintaining the nozzles of said sprinklers free from choking.

In testimony whereof I have affixed my signature in presence of two witnesses.

ALPHONSE BANDELIER.

Witnesses:
   M. CHAPMAN,
   R. ESSELLIER.